(12) United States Patent
Heo

(10) Patent No.: US 9,450,263 B2
(45) Date of Patent: Sep. 20, 2016

(54) ENGAGING STRUCTURE OF FUEL CELL STACK

(71) Applicant: Hyundai Motor Company, Seoul (KR)

(72) Inventor: Yongsuk Heo, Seoul (KR)

(73) Assignee: Hyundai Motor Company, Seoul (KR)

( * ) Notice: Subject to any disclaimer, the term of this patent is extended or adjusted under 35 U.S.C. 154(b) by 317 days.

(21) Appl. No.: 14/090,522

(22) Filed: Nov. 26, 2013

(65) Prior Publication Data

US 2014/0162168 A1    Jun. 12, 2014

(30) Foreign Application Priority Data

Dec. 12, 2012   (KR) .......................... 10-2012-0144853

(51) Int. Cl.
*H01M 8/24*    (2016.01)
*H01M 8/10*    (2016.01)

(52) U.S. Cl.
CPC ........... *H01M 8/2465* (2013.01); *H01M 8/248* (2013.01); *H01M 8/2475* (2013.01); *H01M 2008/1095* (2013.01); *H01M 2250/20* (2013.01); *Y02E 60/50* (2013.01); *Y02T 90/32* (2013.01)

(58) Field of Classification Search
CPC ............. H01M 8/248; H01M 8/2475; H01M 8/2465; H01M 2250/20; H01M 2008/1095; Y02T 90/32; Y02E 60/50

USPC .................................................. 429/400–535
See application file for complete search history.

(56) References Cited

U.S. PATENT DOCUMENTS

| | | | | |
|---|---|---|---|---|
| 5,686,200 | A | * 11/1997 | Barton .................... | H01M 8/02 429/511 |
| 2011/0086292 | A1 | * 4/2011 | Ko ........................ | H01M 8/248 429/507 |

FOREIGN PATENT DOCUMENTS

KR    1020050045070 A  *  5/2005 .............. H01M 8/24

OTHER PUBLICATIONS

Machine English translation of KR1020050045070.*

* cited by examiner

*Primary Examiner* — Milton I Cano
*Assistant Examiner* — Michael Dignan
(74) *Attorney, Agent, or Firm* — Mintz Levin Cohn Ferris Glovsky and Popeo, P.C.; Peter F. Corless

(57) ABSTRACT

A fuel cell stack is provided that includes: i) a plurality of unit cells that are stacked together; ii) end plates that are each disposed at outermost ends of the unit cells and that press the plurality of unit cells together; and iii) a plurality of tension bars that engage the end plates, wherein an tension bar corresponding to an outermost portion of the unit cells has a predetermined angle of slope and engages with the end plate.

15 Claims, 5 Drawing Sheets

ENGAGING STRUCTURE OF FUEL CELL STACK

CROSS-REFERENCE TO RELATED APPLICATION

This application claims priority to and the benefit of Korean Patent Application No. 10-2012-0144853 filed in the Korean Intellectual Property Office on Dec. 12, 2012, the entire contents of which are incorporated herein by reference.

BACKGROUND (a) Field of the Invention

The present invention relates to a fuel cell stack. More particularly, the present invention relates to an engaging structure of a fuel cell stack.

(b) Description of the Related Art

A fuel cell system is a kind of electric generation system that generates electrical energy through an electrochemical reaction between a fuel (typically hydrogen) and oxygen. Fuel cell systems have begun to be applied to vehicles in an effort to reduce the reliance on internal combustion engines.

As such these types of fuel cell systems include a fuel cell stack, a fuel (e.g., hydrogen) supply unit that supplies hydrogen to the fuel cell stack, an oxidant (e.g., air) supply unit that supplies air to the fuel cell stack, and a heat/water management device that removes water and reaction heat from the fuel cell stack and that controls an operational temperature of the fuel cell stack.

The fuel cell stack is formed in an electricity generator set in which tens to hundreds of unit cells are continuously arranged. In particular, a unit cell is formed by disposing separators on both sides with a membrane-electrode assembly (MEA) interposed therebetween. In the separator, a flow channel that supplies fuel, e.g., hydrogen, and an oxidant, e.g., air, to the MEA and that circulates a coolant therethrough is formed, and a gasket for sealing the fluid therein is interposed between the separator and the MEA.

Such a fuel cell stack also includes an end plate that is installed at the outermost ends (both sides) of continuously stacked unit cells, and the end plate is engaged through an engaging device so that when installed the end plate presses unit cells together. Here, a surface pressure between unit cells from the engaging device is directly related to material transfer resistance within a gas diffusion layer and ohmic loss by increase of contact resistance and thus it is essential to appropriately maintain an engaging force of unit cells to obtain a good stack performance.

However, because a fuel cell stack that is mounted at a vehicle requests a high performance, a plurality of unit cells of about 1V are stacked together (e.g., 100-300 or more) and thus the entire stack length is increased. Accordingly, a mechanical structure of the fuel cell stack becomes unstable and the fuel cell stack may have a weakened structure.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a fuel cell stack having advantages of obtaining structural stability against an impact and enhancing rigidity of a stack length direction.

An exemplary embodiment of the present invention provides a fuel cell stack including: i) a plurality of unit cells that are stacked together; ii) end plates that are each disposed at outermost ends of the plurality of stacked unit cells and that press the unit cells; and iii) a plurality of tension bars that engage the end plates. In particular, at least one tension bar that corresponds to an outermost portion of the unit cells has a predetermined angle of slope and engages with the end plate.

The tension bar corresponding to the outermost portion of the unit cells may come in contact with an edge bar surface of the end plate, and the edge bar surface may form a predetermined angle of slope in a length direction of the end plate. As such, in some exemplary embodiments of the present invention the slope may preferably be about 1-10°, and more preferably be about 4°.

The edge bar surface of the end plate may be inclined downward toward the outermost unit cell or inclined upward toward the outermost unit cell. Furthermore, the tension bar corresponding to a central portion of the unit cells may be disposed parallel to a length direction of the end plate and may be engaged with the end plate.

Another embodiment of the present invention provides a fuel cell stack including: i) a plurality of unit cells that are stacked together; ii) end plates that are each disposed at outermost sides of the plurality of stacked unit cells and that press the unit cells together; and iii) a plurality of tension bars that engage the end plates. In particular, the tension bars corresponding to an outermost portion of the unit cells support the edge side of the unit cells thereof and engage with the end plate. In such a configuration, at the outermost portion corner side of the unit cells, a slanted surface may be formed. Additionally, the tension bar corresponding to a central portion of the unit cells may be disposed parallel to a length direction of the end plate and may be engaged with the end plate.

In exemplary embodiments of the present invention, by giving a predetermined angle of slope to an tension bar corresponding to an outermost portion of unit cells, by latching the unit cells that may endure an external impact, unit cells can be prevented from becoming separated, and by increasing a section coefficient of an tension bar, structural rigidity of a flexure direction according to increase of a stack length can be enhanced.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE EMBODIMENTS

Figure 1:
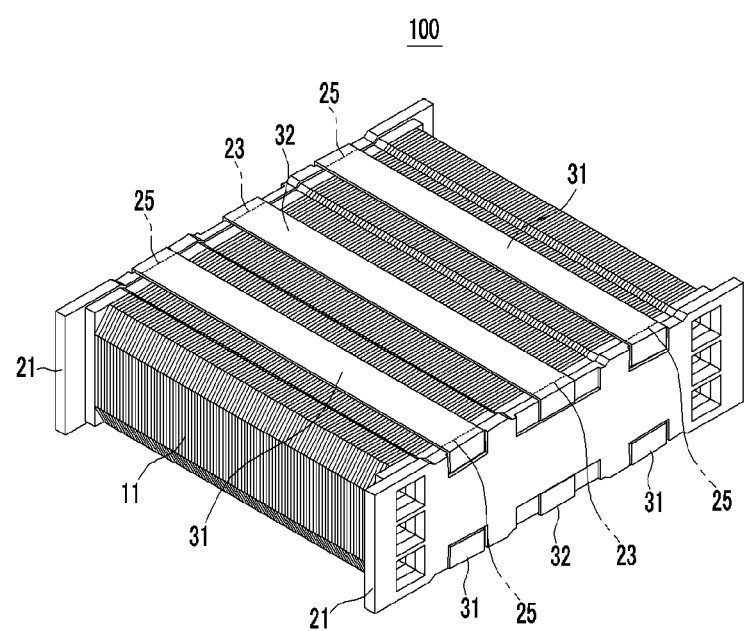
FIG. 1 is a perspective view illustrating a fuel cell stack according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto.

In a detailed description, in order to distinguish the same constituent elements, a first and a second, etc., are used as names of constituent elements and do not represent the order.

In addition, in the entire specification, unless explicitly described to the contrary, the word "comprise" and variations such as "comprises" or "comprising", will be understood to imply the inclusion of stated elements but not the exclusion of any other elements.

In addition, the terms "unit", "means", "portion", and "member" described in the specification indicate a unit of a comprehensive constituent element for performing at least one function and operation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
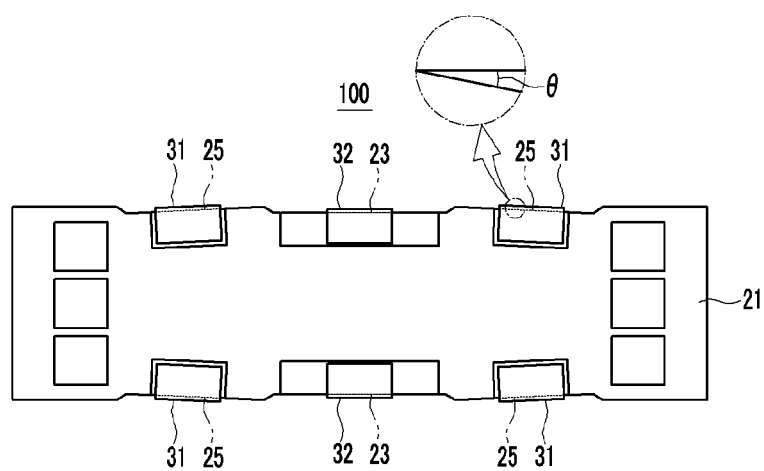
FIG. 2 is a schematic diagram illustrating a side surface of a fuel cell stack according to an exemplary embodiment of the present invention.

FIG. 1 is a perspective view illustrating a fuel cell stack according to an exemplary embodiment of the present invention, and FIG. 2 is a schematic diagram illustrating a side surface of a fuel cell stack according to an exemplary embodiment of the present invention.

Referring to FIGS. 1 and 2, a fuel cell stack 100 according to an exemplary embodiment of the present invention is an electricity generator set of unit cells 11 that generate electrical energy through an electrochemical reaction of hydrogen, which is fuel and air which is an oxidizing agent.

At the outermost ends (both sides) of continuously stacked unit cells 11, end plates 21 are each disposed. These end plates 21 press the unit cells 11 therebetween together while being engaged therewith. The end plates 21 in the exemplary embodiment of the present invention are engaged by a plurality of tension bars 31 and 32. These tension bars 31 and 32 are formed in e.g., a belt like shape having a predetermined width and length and are disposed in a stacking direction of the unit cells 11.

For example, in the drawing, the tension bars 31 and 32 come in contact with an upper edge surface and a lower edge surface of the end plates 21, and both end portions are formed in a bent shape at an outer side surface of the end plates 21. Here, at the upper edge surface and the lower edge surface of the end plates 21, a plurality of bar surfaces 23 and 25 in which the tension bars 31 and 32 come in contact with are formed.

In this case, the tension bars 31 and 32 each correspond to the outermost portion and a central portion of the unit cells 11 and are disposed in a stacking direction of the unit cells 11. The tension bars 31 and 32 come in contact with the bar surfaces 23 and 25 of the end plates 21, and both end portions thereof are engaged with the end plate 21 through a bolt (not shown).

In an exemplary embodiment of the present invention, the fuel cell stack 100 that is formed in this way provides structural stability against an impact to prevent the unit cell 11 from separating, and by increasing a section coefficient of the tension bars 31 and 32, the fuel cell stack 100 has a structure that can enhance structural rigidity in a stack length direction. For this purpose, in the fuel cell stack 100 according to an exemplary embodiment of the present invention, the tension bar 31 corresponding to an outermost portion of the unit cells 11 has a predetermined angle of slope θ and is engaged with the end plate 21.

The tension bar 31 corresponding to an outermost portion of the unit cells 11 comes in contacts with the bar surface 25 of the end plate 21 and engages with the end plate 21 through a bolt (not shown). Here, the bar surface 25 of the end plate 21 forms a predetermined angle of slope θ in a length direction of the end plate 21. In this case, the bar surface 25 of the end plate 21 may be formed to be inclined downward toward the outermost unit cell 11 in a length direction of the end plate 21. Additionally, the slope θ may be about 1-10° and preferably about 4°.

The tension bar 32 corresponding to a central portion of the unit cells 11 comes in contacts with the bar surface 23 of the end plate 21 and engages with the end plate 21 through a bolt (not shown). In this case, the tension bar 32 is disposed parallel in a length direction of the end plate 21 and engages with the end plate 21. The bar surface 23 that comes in contacts with the tension bar 32 is formed parallel in a length direction of the end plate 21.

Therefore, the fuel cell stack 100 according to an exemplary embodiment of the present invention having the above-described configuration gives a predetermined angle of slope θ to the tension bar 31 corresponding to an outermost portion of the unit cells 11 and thus the tension bar 31 latches together the unit cells 11 that are pushed by an external impact, thereby preventing the unit cells 11 from separating.

Figure 3:
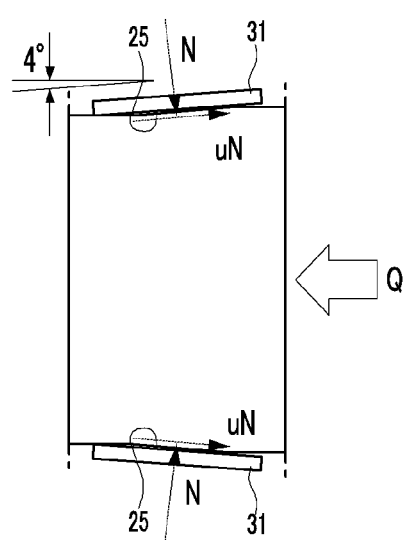
FIG. 3 is a diagram illustrating operation of a fuel cell stack according to an exemplary embodiment of the present invention.

Referring to FIG. 3, specifically, Table 1 shows a force that is transferred to the unit cells 11 upon colliding in Comparative Example that does not give a slope θ to an tension bar corresponding to an outermost portion of the unit cells 11 and in an exemplary embodiment of the present invention that gives a slope θ of 4° to an tension bar corresponding to an outermost portion of the unit cells 11.

TABLE 1

| Division | μ = 0 | μ = 0.2 | μ = 0.4 |
|---|---|---|---|
| Comparative Example (θ = 0°) | ∞ | 2.5Q | 1.25Q |
| Exemplary embodiment (θ = 4°) | 7.167Q | 1.875Q | 1.066Q |

Such results may be obtained from:

$$\Sigma F_X = -Q + 2\mu N \cos\theta + 2N \sin\theta, N = Q/(2\mu \cos\theta + 2N \sin\theta).$$ Eq. 1

Here, Q represents a force that is transferred to the unit cells 11 upon colliding, N represents a vertical drag of the tension bar 31, μ represents a static friction coefficient, and θ represents a slope of the tension bar 31.

As shown in Table 1, when the fuel cell stack 100 collides, a vertical drag of the tension bar is involved in a push phenomenon of the unit cells 11, and in Comparative Example, because a slope θ is not given to the tension bar, there is no support that supports the unit cells 11 that are pushed by a collision and thus a value N is remarkably lowered and upon colliding, a force that is transferred to the unit cells 11 increases.

However, in an exemplary embodiment of the present invention, by giving a slope θ of about 4° to the tension bar 31 corresponding to the outermost portion of the unit cells 11, by supporting the unit cells 11 that are impacted by collision through the tension bar 31, a value N increases and thus upon colliding, a force that is transferred to the unit cells 11 reduces.

Accordingly, in an exemplary embodiment of the present invention, by giving a predetermined angle of slope θ to the tension bar 31, as a force that is transferred to the unit cells 11 is reduced while supporting the unit cells 11 that are pushed by an external impact according to a vehicle collision, the unit cells 11 can be prevented from separating according to a collision of the fuel cell stack 100 by applying the Applicant's configuration to the fuel cell stack. In the fuel cell stack 100 according to an exemplary embodiment of the present invention having the above-described configuration, by giving a predetermined angle of slope θ to the tension bar 31 corresponding to the outermost portion of the unit cells 11, a section coefficient of the tension bar 31 increases and thus structural rigidity of a flexure direction according to increase of a stack length can be enhanced. Specifically, Table 2 shows a section coefficient of the tension bar 31 in Comparative Example that does not give a slope θ to an tension bar corresponding to the outermost portion of the unit cells 11 and in an exemplary embodiment of the present invention that gives a slope θ of about 4° to the tension bar 31 corresponding to the outermost portion of the unit cells 11.

TABLE 2

| Division | Comparative Example (θ = 0°) | Exemplary embodiment (θ = 4°) |
|---|---|---|
| Section coefficient of tension bar | $2.857 \times 10^6$ mm | $2.969 \times 10^6$ mm |

As shown in Table 2, in an exemplary embodiment of the present invention, by giving a slope θ of about 4° to the tension bar 31 corresponding to the outermost portion of the unit cells 11, the deflection amount of about 3.8% is reduced, compared with Comparative Example, and as a section coefficient of the tension bar 31 increases, flection resistance of a stack length direction increases and thus structural rigidity of a flexure direction increases according to increase of a stack length.

Figure 4:
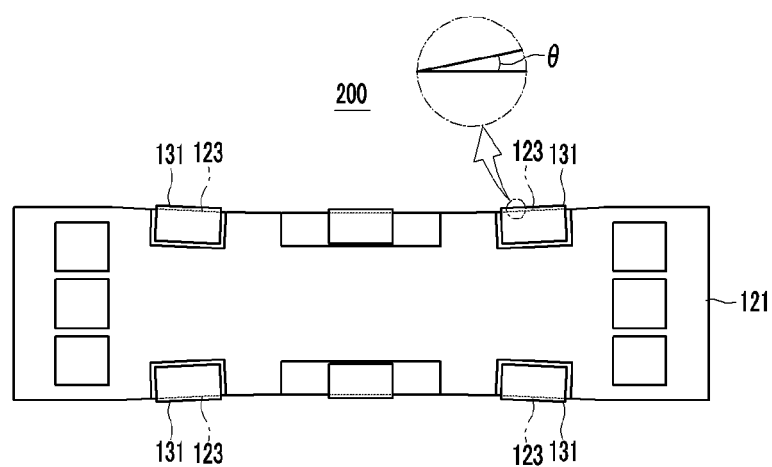
FIG. 4 is a schematic diagram illustrating a side surface of a fuel cell stack according to another exemplary embodiment of the present invention.

FIG. 4 is a schematic diagram illustrating a side surface of a fuel cell stack according to another exemplary embodiment of the present invention. Referring to FIG. 4, in a fuel cell stack 200 according to another exemplary embodiment of the present invention, while basically giving a predetermined angle of slope θ to an tension bar 131 corresponding to an outermost portion of unit cells, a bar surface 123 of an end plate 121 is formed to be inclined upward toward an outermost unit cell.

That is, in an exemplary embodiment of the present invention, the bar surface 123 of the end plate 121 may be formed to be inclined upward toward the outermost unit cell so that a slope direction of the tension bar 131 corresponding to an outermost portion of unit cells may be opposite to a slope direction in the foregoing exemplary embodiment.

The remaining configuration, operation, and effect of the fuel cell stack 200 according to another exemplary embodiment of the present invention are the same as those of the foregoing exemplary embodiment and therefore a detailed description thereof will be omitted.

Figure 5:
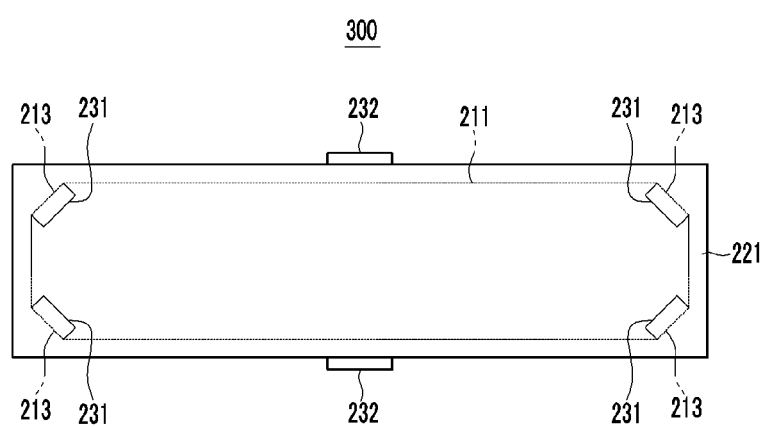
FIG. 5 is a schematic diagram illustrating a side surface of a fuel cell stack according to another exemplary embodiment of the present invention.

FIG. 5 is a schematic diagram illustrating a side surface of a fuel cell stack according to another exemplary embodiment of the present invention. Referring to FIG. 5, in a fuel cell stack 300 according to another exemplary embodiment of the present invention, tension bars 231 corresponding to an outermost portion of unit cells 211 support a corner side of the unit cells 211 and engage with an end plate 221, unlike the foregoing exemplary embodiments. Here, at the outermost portion corner side of the unit cells 211, a slanted surface 213 is formed, and the tension bars 231 corresponding to an outermost portion of unit cells 211 are supported to the slanted surface 213.

An tension bar 232 corresponding to a central portion of the unit cells 211 is disposed parallel in a length direction of the end plate 221 and engages with the end plate 221. Therefore, in an exemplary embodiment of the present invention, because the tension bar 231 corresponding to an outermost portion of the unit cells 211 is supported to the slanted surface 213 at the corner side of the outermost portion, structural stability of the fuel cell stack 300 can be enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 11, 211 . . . unit cell
21, 121, 221 . . . end plate 23, 25, 123, . . . bar surface
31, 32, 131, 231, 232 . . . tension bar
213 . . . slanted surface

What is claimed is:

1. A fuel cell stack, comprising:
a plurality of unit cells that are stacked together;
a pair of end plates that are respectively disposed at outermost ends of the unit cells and that press the plurality of stacked unit cells together; and
a plurality of tension bars that engage with the pair of end plates,
wherein at least one of the plurality of tension bars engages with at least one of the pair of end plates forming a predetermined angle of slope between a width direction of the engaged at least one tension bar and a length direction of the engaged at least one end plate, the at least one tension bar being outermost in the length direction of the pair of end plates, and
wherein the tension bar corresponding to the outermost portion of the plurality of unit cells comes in contact with an edge bar surface of the at least one of the pair of end plates, and the edge bar surface forms a same predetermined angle of slope as the tension bar in a length direction of the pair of end plates.

2. The fuel cell stack of claim 1, wherein the slope is about 1-10°.

3. The fuel cell stack of claim 2, wherein the slope is about 4°.

4. The fuel cell stack of claim 1, wherein the edge bar surface of the at least one of the pair of end plates is inclined downward toward the outermost unit cell.

5. The fuel cell stack of claim 1, wherein the edge bar surface of the at least one of the pair of end plates is inclined upward toward the outermost unit cell.

6. The fuel cell stack of claim 1, wherein at least one tension bar corresponding to a central portion of the unit cells is disposed parallel to a length direction of the pair of end plates and is engaged with the at least one of the pair of end plates.

7. A fuel cell stack, comprising:
a plurality of unit cells that are stacked together;
a pair of end plates that are respectively disposed at outermost ends of the plurality of stacked unit cells and that press the plurality of unit cells together; and
a plurality of tension bars that engage the pair of end plates,
wherein at least one of the tension bars corresponding to an outermost portion of the unit cells support an edge side of the unit cells thereof and engages with at least one of the pair of end plates forming a predetermined angle of slope between a width direction of the engaged at least one tension bar and a length direction of the engaged at least one end plate, the at least one tension bar being outermost in the length direction of the pair of end plates, and
wherein the tension bar corresponding to the outermost portion of the plurality of unit cells comes in contact with an edge bar surface of the at least one of the pair of end plates, and the edge bar surface forms a same predetermined angle of slope as the tension bar in a length direction of the pair of end plates.

8. The fuel cell stack of claim 7, wherein at an outermost portion corner side of the unit cells, a slanted surface is formed.

9. The fuel cell stack of claim 7, wherein at least one tension bar corresponding to a central portion of the unit cells is disposed parallel to a length direction of the pair of end plates and is engaged with the at least one of the pair of end plates.

10. A vehicle powered by a fuel cell stack, the vehicle comprising:
a fuel cell stack including:
a plurality of unit cells that are stacked together;
a pair of end plates that are respectively disposed at outermost ends of the unit cells and that press the plurality of stacked unit cells together; and
a plurality of tension bars that engage with the pair of end plates,
wherein at least one of the plurality of tension bars engages with at least one of the pair of end plates forming a predetermined angle of slope between a width direction of the engaged at least one tension bar and a length direction of the engaged at least one end plate, the at least one tension bar being outermost in the length direction of the pair of end plates, and
wherein the tension bar corresponding to the outermost portion of the plurality of unit cells comes in contact with an edge bar surface of the at least one of the pair of end plates, and the edge bar surface forms a same predetermined angle of slope as the tension bar in a length direction of the pair of end plates.

11. The vehicle of claim 10, wherein the slope is about 1-10°.

12. The vehicle of claim 11, wherein the slope is about 4°.

13. The vehicle of claim 10, wherein the edge bar surface of the at least one of the pair of end plates is inclined downward toward the outermost unit cell.

14. The vehicle of claim 10, wherein the edge bar surface of the at least one of the pair of end plates is inclined upward toward the outermost unit cell.

15. The vehicle of claim 10, wherein at least one tension bar corresponding to a central portion of the unit cells is disposed parallel to a length direction of the pair of end plates and is engaged with the at least one of the pair of end plates.

* * * * *